June 17, 1969
P. D. HEATH
3,451,015
MICROWAVE-STRIPLINE FILTER
Filed March 21, 1966
Sheet 1 of 3
FIG. 1.
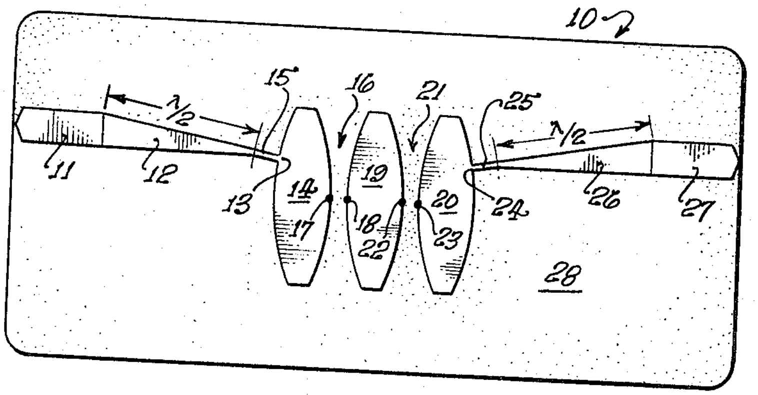
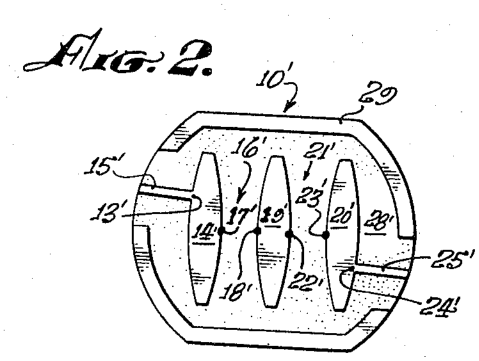
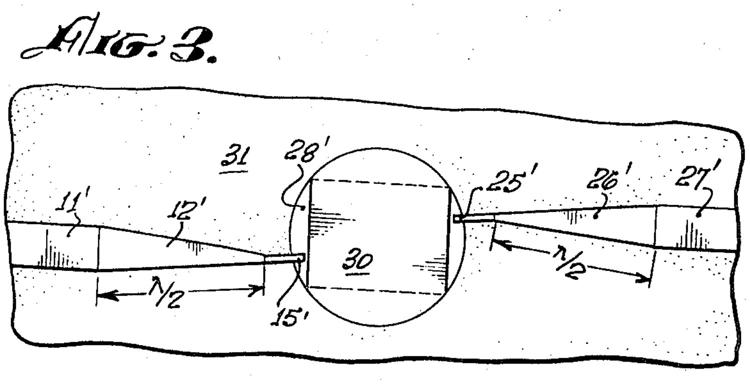
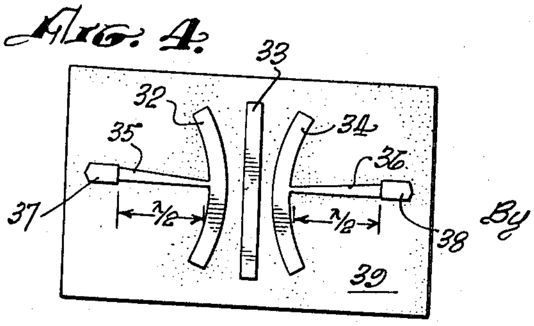
INVENTOR.
PAUL D. HEATH,
By [signature]
ATTORNEY.
L. E. Carnahan
AGENT.

INVENTOR.
PAUL D. HEATH,
By [signature]
ATTORNEY
J E Carnahan
AGENT.

INVENTOR.
PAUL D. HEATH,
By [signature]
ATTORNEY.
[signature: S E Carnahan]
AGENT.

3,451,015
MICROWAVE STRIPLINE FILTER
Paul D. Heath, Riverside, Calif., assignor to General Dynamics Corporation, a corporation of Delaware
Filed Mar. 21, 1966, Ser. No. 535,892
Int. Cl. H03h 5/04
U.S. Cl. 333—73 3 Claims

ABSTRACT OF THE DISCLOSURE

A compact microwave stripline filter with metal strips placed side by side for inductive or capacitive coupling with their longitudinal axes parallel relative to each other and transversely of the direction of signal propagation, and configured to substantially eliminate the nullifying effects of stray, opposing capacitive or inductive fields.

This invention relates to microwave frequency-selective filters, particularly to microwave filters adapted for microstrip transmission lines and circuitry, and more particularly to compact low loss microwave stripline filters.

At frequencies above 50 megacycles, it becomes increasingly difficult to realize electric wave filters employing lumped constant circuit elements in the conventional manner. Inductors and capacitors no longer behave as simple elements, mutual impedance between filter branches becomes significant, and the leads connecting the elements to form the filter may have reactance values of greater magnitude than the desired element values. Inductor Q values obtainable with the usual coil configuration are not large enough for narrow band-pass application or for wide-band application in which it is necessary to produce a transfer characteristic with steep skirts.

At microwave frequencies it is common to employ coaxial line or waveguide for the transmission of electromagnetic energy. Also, microstrip transmission lines have been utilized for propagating waves having a frequency of the order of kilomegacycles and consist generally of a ground planar conductor on which there is arranged a layer of solid dielectric, on top of which dielectric there is supported a thin flat strip-like conductor. The distance between the bottom of the strip conductor and the top of the ground is of the order of 0.1 or less of the wavelength of the waves propagated along said line at the mean frequency. The ground plan conductor is generally wider than the strip conductor. The main field of a wave propagated along said microstrip line lies between the bottom of the strip conductor and the area of the ground plane conductor which is directly beneath it. There is also a fringe field from the side edges of the strip conductor towards the ground plane conductor. On the top of the strip conductor between the edges thereof, there is relatively virtually no field. Such a line differs sharply from coaxial and waveguide structures. It differs from coaxial lines in that the wave is not confined within the structure by an enclosed outer conductor. It differs from waveguides likewise in that the wave is not confined within the structure by completely surrounding walls and also because in the waveguide there is a distinct cutoff frequency which does not appear in microstrip structures.

In microwave receivers the need for an efficient and practical microwave filter has always been considered of paramount importance. The principle purpose of such a filter is to eliminate the possibility of responses to an image signal which could either interfere with the desired signal or completely capture a receiver utilizing limiter stages as are commonly found in communication receivers. The problem resolves itself into the construction of a microwave circuit which provides the required attenuation at the image frequencies, while yet passing the desired signal spectrum free from attenuation and distortion.

Filters utilizing microstrip principles have heretofore been proposed and described as exemplified by U.S. Patents 2,922,123 and 2,984,802. These prior art filters are made by providing resonant sections in the microstrip line, these resonant sections in turn being formed by discontinuities in the line provided at suitably spaced points. Such discontinuities may consist of gaps in the line, lateral extensions on one of the conductors, variations in width of one of the conductors, wires extending crosswise of one of the conductors and probes or pins inserted from one of the conductors to the other. Such prior art microstrip filters generally have a low Q and introduce large insertion losses.

In the prior art, coupling between filter sections and from filter sections to input and output sections has generally been of a conductive or of a capacitance type, as required for a given application. In these prior devices, the coupling, if capacitive, was generally altered by merely changing the spacing between sections. When the conductive strips are carried by a thin dielectric sheet, techniques such as printing, etching, stamping, etc. have been readily employed. Relatively complicated filter structures have been made by merely disposing the conductive strips on a plane surface in the proper configuration, and subsequently inserting the surface between a pair of spaced parallel conductive surfaces. Filters can readily be connected to a coaxial line, for example, by means of very simple transitions.

The filters made in accordance with this invention are of the microwave stripline type with the coupling between the filter sections and the input and output sections being magnetically or electrostatically (inductive or capacitive) coupled. Thus the present invention provides a means of obtaining bandpass structure in microwave stripline having less loss and greater compactness than the prior known filters.

Therefore, it is an object of this invention to provide a microwave filter.

A further object of the invention is to provide a microwave stripline filter having low loss and high compactness qualities.

Another object of the invention is to provide a microwave filter wherein the sections thereof are magnetically coupled.

Another object of the invention is to provide a microwave filter wherein the inductive and capacitive action between the filter sections are effectively controlled.

Another object of the invention is to provide a compact, low loss, magnetically coupled microwave stripline filter.

Other objects of the invention will become readily apparent from the following description and accompanying drawings wherein:

FIGS. 1–5 are views illustrating embodiments of bead type inductively coupled filters made in accordance with the invention;

FIGS. 6 and 7 are views illustrating embodiments of bead type capacitive coupled filters made in accordance with the invention;

Figures 5, 6, 7:
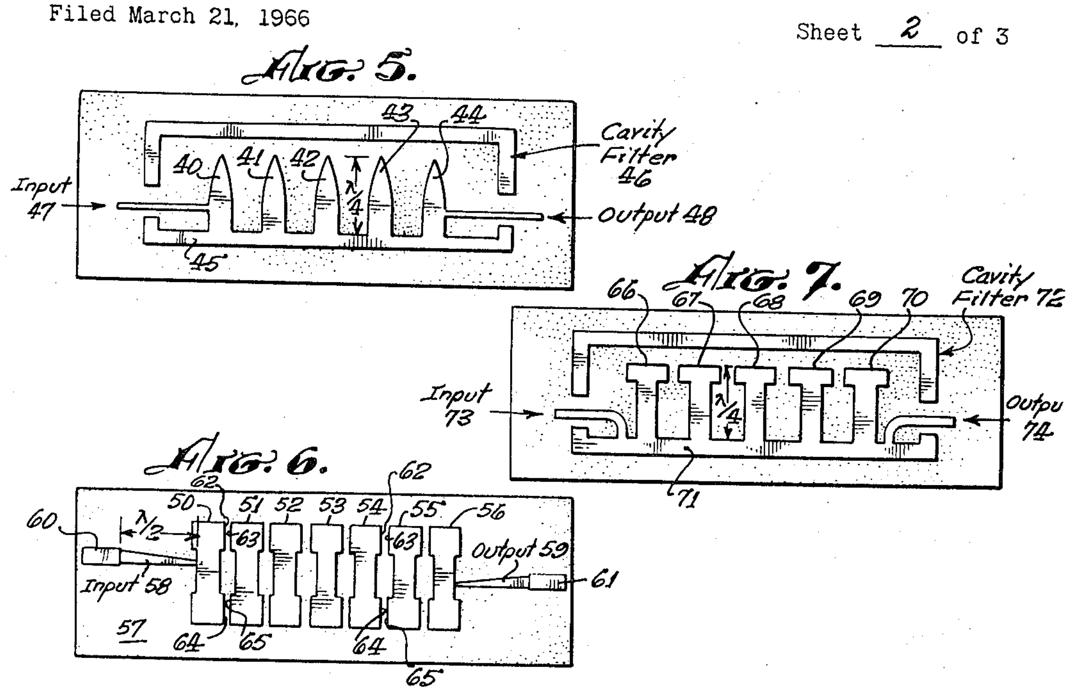

Broadly, this invention relates to a low loss stripline filter characterized by a high degree of compactness. The inventive filters essentially comprise a plurality of magnetically coupled stripline sections, the configuration differing from those of the prior art by placement of the sections side-by-side and by the configuration of the filter sections to substantially eliminate the adverse effects of the prior known filters which were generally rectangularly shaped sections arranged end-to-end and side-by-side. The filter sections of the present invention are arranged with their longitudinal axes parallel relative to each other and transversely of the direction of signal propagation. It has been found that shaping the ends of the filter sections lessens the capacitive coupling in inductive coupled filters and allows a low insertion loss bandpass; while removing portions of the center of the filter sections of the capacitive coupled filters lessens the inductive coupling thereof allowing a reasonably flat bandpass having low insertion loss.

The filters made in accordance with this invention are composed of the filter sections and the input and output transmission line sections formed from a conductive strip and supported midway between a pair of conductive surfaces and insulated therefrom, the pair of conductive surfaces being maintained at a common potential to form ground planes. The filter sections, as described in greater detail hereinafter, may be formed on one conductive surface with the input and output sections formed on another conductive surface whereafter these surfaces are bonded together to essentially form a single conductive surface. Also, the filter sections and the input and output sections therefor may be made from conductive surfaces as a pair of mirror images and then so bonded together as to form a single conductive surface. Also, the coupling from the input and output sections can be conductive, inductive, or capacitive as meets the requirements of a given application. In addition, the filters of this invention are so constructed that the signal may be sent through the filter in either direction.

Referring now to the drawings, in the bead type filter embodiment illustrated in FIG. 1 and generally indicated at 10, the signal enters on terminal 11, which, for example, may have a normal impedance of 50 ohms for stripline having a ⅛ inch ground plane spacing. From the short length of line or terminal 11 there is an impedance transformer strip 12 which is approximately equal to a half wave length or greater than the operating frequency. Between strip 12 and point 13 on the reasonant element or bead 14, there is a short strip 15 of high impedance line which distributes a magnetic field less than a 50 ohm line which end allows greater precision in selecting the tap point to match the impedance of the resonant circuit to an impedance for proper loading. This excites the first resonant circuit which develops energy across the gap 16 at approximately points 17 and 18 to excite the second resonant circuit of element or bead 19 by means of nearly pure inductive coupling. At the extreme outer ends of elements 14 and 19 there is some capacitive coupling which is made as small as possible by the reduced capacitance on the side of the resonant elements by the tapering or curving configuration of these elements as shown. The energy distribution from the second element 19 into a third element 20 across the gap 21 at points 22 and 23 excites the third element 20 in the same manner (inductive coupling), element 20 having a tap out point indicated at 24 which is similarly located as is point 13 in the first element or bead 14. The energy is then matched to an outgoing line by means of a high impedance strip 25, a half wave transformation strip 26 into a terminal or output line 27, which may, for example, be of a 50 ohm impedance.

The amount of coupling across the gaps 16 and 21 is adjusted by means of the spacing between the elements 14, 19, and 20 to allow a maximally flat or an equal ripple pass band response. Each element 14, 19, and 20 resonates primarily because of its length which is counting the infringing capacity equal to an electrical half wave at the frequency resonance. The circuit current in each of the beads or elements is at a maximum along the center of the element with capacity coupling to the ground planes at the ends of the element. The lead path is on the inside of the two outside ground planes. The frequency at which each element 14, 19, and 20 resonates is inversely proportional to the square root of the dielectric constant. That is, the larger the dielectric constant, the lower the frequency.

The shape of the beads or elements 14, 19 and 20 is such as to allow the current flow path on each element to be as short as possible for greater efficiency. The input and output lines and the elements or beads in this embodiment are etched from a conductive surface bonded on a plastic material 28 such as polyethylene, polypropylene, or Teflon fiber glass which is of the double clad type as known in the art. The main feature of this type filter is to maximize the inductive coupling and minimize the capacitive coupling since they are by nature of opposite sense and would nullify each other if allowed to be equal.

The FIG. 1 filter embodiment may be constructed by bonding together a pair of matching or mirror images such as illustrated in FIG. 1 so that each of the etched elements of the mirror images essentially becomes integral, whereby the completed filter comprises a conductor surface composed of the elements described above and positioned intermediate a pair of ground planes and separated therefrom by the insulation material 28, as known in the art.

FIGS. 2 and 3 illustrate another embodiment of a bead type inductively coupled filter 10′ which functions essentially in the same manner as the FIG. 1 embodiment and will thus be referenced by similar numerals where applicable. The signal enters element or bead 14′ at point 13′ via input line or strip 15′. This excites element 14′ and develops energy across gap 16′ at points 17′ and 18′ which excites element or bead 19′ by means of substantially pure inductive coupling. This develops energy across gap 21′ at points 22′ and 23′ which excites element or bead 20′. The energy is then matched to the outgoing line by means of line or strip 25′ operatively connected to element 20′ at point 24′. If desired, the central element or bead 19′ may be shorter in length than the outer elements 14′ and 20′. One difference between this embodiment and that of FIG. 1 is that a border 29 which provides self shielding of the filter elements extends substantially around the edges of the filter and is adapted for connection with the ground plane on the side of the insulation material 28′ opposite from the etched circuit. However, border 29 may be omitted if desired.

The filter circuit of FIG. 2 is etched on a disc of ceramic type material 28′ and is provided with a cover member or disc 30 as shown in FIG. 3 which is constructed of the same material and has the same external configuration but is positioned at 90° with respect to the circuit portion or disc 28′ of FIG. 2. Disc 30 is so positioned that lead-in and lead-out lines or strips on the mother board 31 overlap the strips 15′ and 25′ of disc 28′ and are bonded together by conventional means, such as by pressure contact. The embodiment of FIGS. 2 and 3 provides a block-in type filter which can be readily assembled within a plastic mounted stripline structure 31 via impedance transformer strips 12′ and 26′ which interconnect the strips 15′ and 25′, respectively, with lines 11′ and 27′, as described above with respect to FIG. 1.

In the FIGS. 2 and 3 embodiment, the cover disc 30 may, if desired, be provided with the complete filter circuit as is disc 28′ except in this instance the circuit etched on disc 30 would be positioned at 90° with respect to the circuit on disc 28′ and bonded together to form a single central stripline conductor positioned between and insulated from the external ground planes bonded to the opposite sides of the discs 28′ and 30 as known in the art.

While not shown, coupling of the lead-in to the beads or elements of the FIGS. 1 and 2 filters may also be accomplished by means of a short to the ground planes at the center line or transverse axis of the bead, and at a predetermined distance from the bead so that the intense part of the field will couple to the magnetic field or the resonant bead, whereby the bead is divided into quarter wavelengths. Another method of doing this is to make the short a half wave further away from the center line of the bead so that the low impendance point will cross opposite the path and give a full half wave of magnetic coupling. This latter approach allows more spacing between the lead-in line and the bead but it does have the disadvantage of increasing the losses due to the standing wave existing on the lead-in line between this short and the middle of the path where the coupling takes place. The lead-in line in effect becomes a resonant section due to the standing wave but it is heavily loaded so will be relatively frequency insensitive. This method of coupling allows the input line to be grounded to the two ground planes to provide, for example, a diode DC current return path as such is needed.

FIG. 4 illustrates another embodiment of the bead type filter and comprises a three (3) element filter with half wave tap-in lines as described above; however, this filter uses relatively uniform elements. The FIG. 4 embodiment functions essentially in the same manner as the FIG. 1 device. Elements 32, 33, and 34 are resonant at the same frequency when allowance is made for the disturbance by the tap-in or lead-in lines 35 and 36. The two outside elements 32 and 34 have the outer ends thereof bent away from element 33 for approximately $\lambda/8$ of their total length. This leaves approximately $\lambda/4$ for magnetic field coupling. This decreases the capacitive coupling effect while allowing satisfactory inductive coupling effect. The $\lambda/2$ waves taper of lead-in lines 35 and 36 are not necessary when the elements are long enough so that straight lead-in lines can be used efficiently. Lead-in lines 35 and 36 are connected to circuit lines 37 and 38 respectively. The elements 32–34 and lead-ins 35 and 36 are etched or deposited on satisfactory insulative material 39 and interposed between a pair of ground planes as previously described. Either capacitive or conductive tap-in lines can be used, depending on the rest of the circuitry used with the filter, and the use thereof is well known in the art.

The FIG. 5 embodiment extends the principle of side by side resonant elements wherein quarter wave elements are utilized which have half the losses and half the length of the half wave elements previously described. In the FIG. 5 embodiment, the filter elements 40, 41, 42, 43 and 44 are approximately a quarter wave length long and are each grounded to the two ground planes of the stripline at the bottom broad end indicated generally at 45 or mounted on a wall of a box structure making an ear cavity type filter 46 wherein the capacitive couplings have been decreased by shaping the free ends of the elements as in the above described bead filters allowing the magnetic field of the elements to inductively couple them to one another. The lead-ins 47 and 48 are normal impedance lines from coaxial connectors tapped into the two extreme elements 40 and 44, respectively, at a proper loading point to match the structure electrically. In this embodiment the percentage band pass is controlled by the element-to-element spacing and for each coupling. Thus, there is an optimum matching to provide the desired band pass shape. This type of filter permits higher unloaded Q's and less insertion loss for the same slope rejection ratios.

FIG. 6 illustrates an embodiment of a capacitive type filter, made in accordance with the invention, wherein the center of the capacitively coupled side by side elements is partially removed to lessen the inductive coupling which thus allows a reasonably flat bandpass having low insertion loss. The FIG. 6 filter consists of a plurality of beads or elements 50, 51, 52, 53, 54, 55 and 56 etched or deposited on a suitable substrate 57 as known in the art. Each of the elements 50–56 has portions of the central portion thereof removed to substantially define an I-shaped configuration. Operatively connected to elements 50 and 56 are input and output impedance transformation strips 58 and 59 which are approximately equal to a half wave length at the frequency of operation as described above. Strips 58 and 59 are in turn operably connected to terminals or lines 60 and 61 of the associated stripline circuit. All of the elements 50–56 are resonant to the same center frequency. The center section of each element is removed to reduce inductive coupling effects. The capacitive coupling between surfaces 62–63 and 64–65 of each pair of elements is more than twice that of a single end type coupling of the same spacing. Due to the increase in inductance of the center section the total length of the elements is decreased over the resonant length of equivalent straight-sided elements thus substantially reducing the loss in the elements.

The FIG. 6 type of filter has two advantages over the end-coupled type; namely, (1) it uses space much more effectively, and (2) it is less than half as sensitive to coupling tolerances. A further advantage of the instant filter is less cross-coupling area to other circuits. For example, a five section C-band filter would occupy less than 1 sq. inch of board space, not considering leads into and out of the filter sections. Thus, a C-band filter can be subminiaturized, and an X-band filter micro miniaturized. In addition, the lower tolerance on couplings per unit allows better yields in production with attendant cost savings.

The FIG. 6 filter may be modified by changing the configuration of the reduced central section of the elements or beads or by reducing or increasing the number of beads utilized. The shape of the elements 50–56 may be substantially modified as long as it tends to accentuate the capacitive coupling over the inductive coupling since these couplings are essentially 180° out of phase with one another.

FIG. 7 illustrates a capacitive type filter similar to FIG. 6 but wherein quarter wave elements are utilized, therefore having half the losses and half the length of the half wave elements as previously described with the inductive type coupled filter of FIG. 5. In the FIG. 7 embodiment, the filter sections or elements 66, 67, 68, 69, and 70 are approximately a quarter wave length long and are each grounded to the two ground planes of the stripline at the bottom end 71 or mounted on a wall of a box structure having an ear cavity type filter 72, wherein the inductive couplings have been decreased by reducing the attached ends (the center portion of a half wave length element) of the elements as previously described, allowing the electrostatic field of the elements to capacitively couple them to one another. Tap-in or lead-in lines 73 and 74 are normal impedance lines from coaxial connectors tapped into the bottom portion 71 at a proper loading point to match the structure electrically by means of magnetic coupling. The amount of coupling is such that the proper loading for the type of bandpass desired is achieved. The filter may be comprised of as many elements as is desired to give the amount of rejection required on the band pass slopes.

Figure 8:
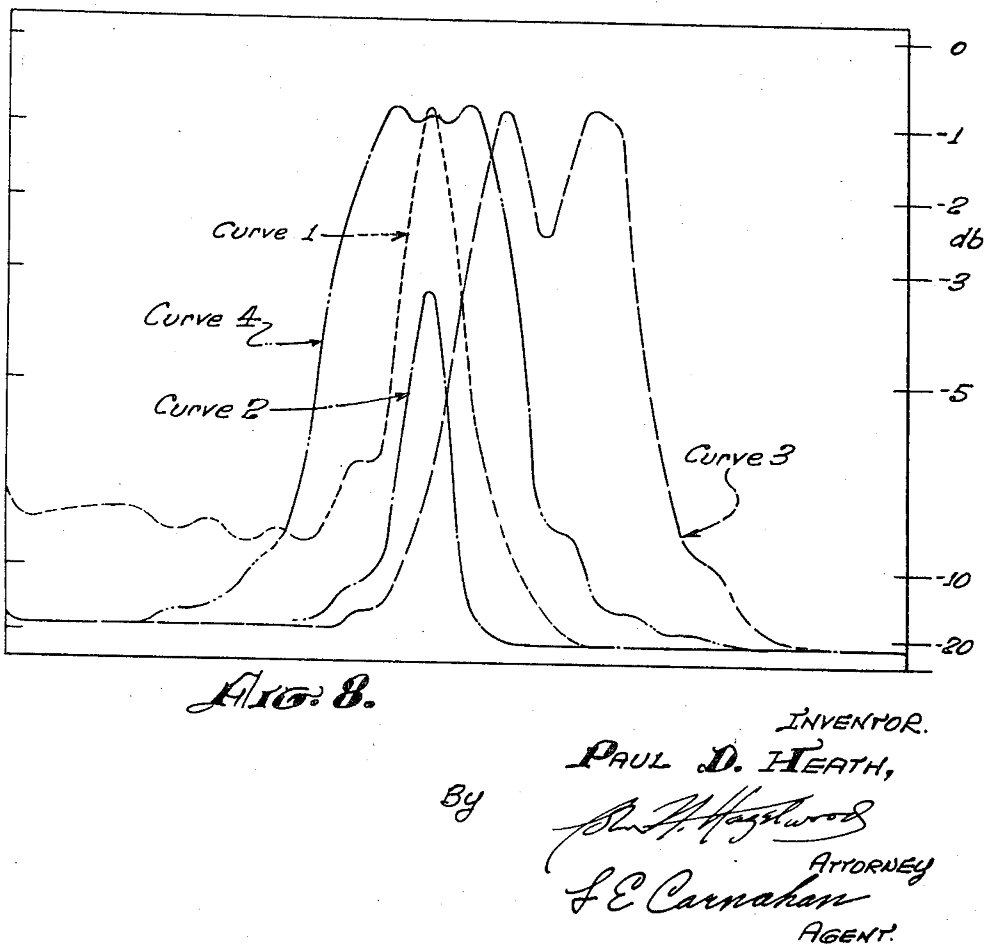
FIG. 8 is a graph illustrating the operation of the inventive magnetically coupled bead type filters.

FIG. 8 graphically illustrates the advantages of the inductively coupled type filter of the invention. The curves of FIG. 8 were obtained from tests which verify the theory underlying this invention. These tests proved that in side by side resonant elements tuned to the same frequency there cannot be capacitive and inductive couplings at the same time since each type of coupling tends to cancel the other type.

Curve No. 1, indicated by a dotted line, shows the response of a single element at C-band with swept frequency. Note that the peak output shows a loss of about ¾ db. The element from which Curve No. 1 was made is of a rectangular configuration having a length of about 0.6 inch and a width of about 0.2 inch, the input and output to the element being of the tapering type as previously described.

Curve No. 2, indicated by a dot-dash line, is similar in configuration to Curve No. 1 except that the loss is increased to about 3¼ db. The element utilized for Curve No. 2 is of the same configuration as above described with respect to Curve No. 1 except that a slot of about 0.015 inch (15 mils) width extends lengthwise dividing the element into two equal elements, causing an insertion loss of about 2½ db greater than the single element. The filter which produced Curve No. 2 illustrates the prior art side-by-side arrangement.

Curve No. 3, indicated by a dashed line, shows a marked over-coupled response with only about 1 db loss at the peaks. This was obtained with the divided element used for Curve No. 2 by removing some of the capacity coupling on each end of each element on the facing sides, in accordance with the invention, thus accentuating the inductive coupling. This also moved the bandpass to a higher frequency. The material removed from the facing sides of the elements was made by a tapering cut extending from points adjacent the slot and about 0.15 inch from the ends of the elements to points to about ⅓ of the distance across the width of the elements.

Curve No. 4, indicated by a dot-dot-dash line, shows that by reshaping the slot between the elements used for Curve No. 3 to define curved facing surfaces in accordance with the invention, the bandpass is flattened and the center is moved to the same frequency region that the single element tuned. This clearly shows the advantage of the curved concept of the invention which allows substantially only, in this instance, inductive coupling. The slot between the elements was reshaped to define a distance of about 0.038 inch between the elements at the center portion thereof. The curvature of the slot for producing Curve No. 4 had a radius of about 1.1 inches.

In view of the foregoing, it is clearly seen that the bead type filter of the present invention provides a greater compactness with less insertion loss than the filters previously known, thus greatly advancing the state of the art.

Figures 9, 10, 11, 12:
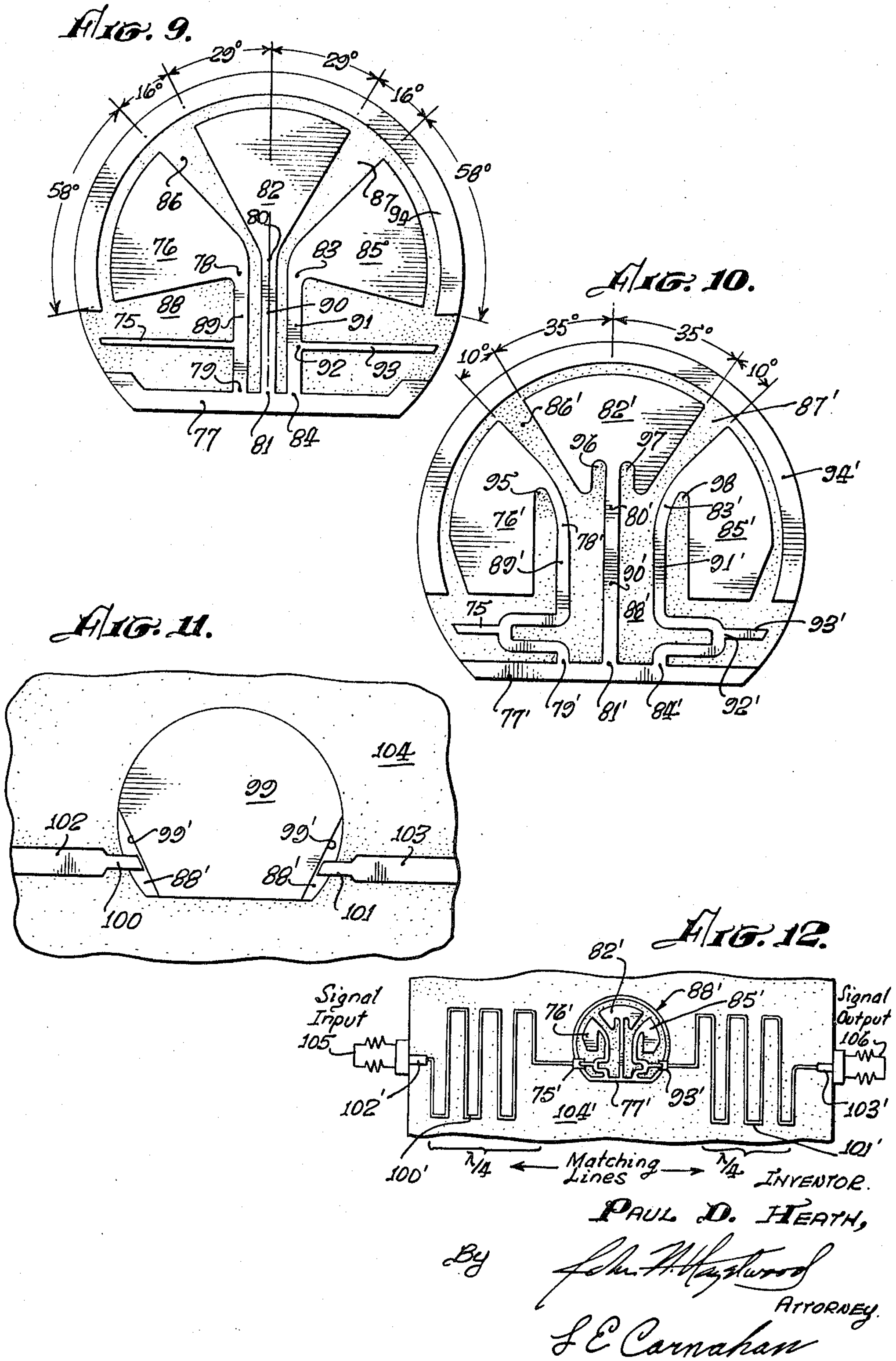
FIGS. 9–11 are views illustrating embodiments of fan type magnetically coupled filters made in accordance with the invention.
FIG. 12 illustrates a circuit incorporating the FIGS. 10 and 11 embodiment of the fan type filter.

FIGS. 9–11 illustrate fan type filter assemblies made in accordance with the invention, and provide a miniaturized microwave stripline filter which is completely self-shielding and readily adapted for use with preformed circuit board sub-assemblies. These embodiments, as illustrated, each essentially comprise a pair of approximately five-eighths inch diameter disc-shaped dielectric elements with copper deposited on all surfaces, one flat surface of each disc being given a desired electrical filter characteristic by the removal of all but a selected pattern of copper prior to their being integrally bonded together with the pattern-bearing surfaces contacting, as described above with respect to the bead type embodiments of the invention.

Referring now to FIG. 9, an incoming signal is received by input lead or line 75 and fed to first resonant element 76 which is tapped to ground 77 so as to properly load the input element 76. The signal transfers by means of the magnetic field existing between points 78 and 79 of element 76 and points 80 and 81 on a second resonant element 82 to inductively couple the first element 76 to the second element 82. The signal then transfers by means of the magnetic field existing between points 80 and 81 on the second element 82 and points 83 and 84 on a third resonant element 85 to inductively couple the second element 82 to the third element 85. The capacitive coupling across the gaps 86 and 87 between the resonant elements from the center to the outside of the disc 88 is made small enough so that it has little nullifying effect on the inductive coupling of the leg portions 89, 90, and 91 thereof. The output is taken off from a loading point 92 on element 85 by an output lead or line 93. Surrounding elements 76, 82, and 85 is a border 94 which functions as a ground plane inasmuch as the ground plane on the opposite side of the filter elements is brought up over the edge of the disc 88 to provide complete shielding when the top and bottom members or discs are mated, as described in greater detail hereinafter with respect to FIGS. 10 and 11.

By way of example, the FIG. 9 embodiment is constructed of a double copper clad ceramic disc with the filter elements etched from the copper clad on the one surface. The disc has a ⅝ inch diameter and is 1/16 inch thick. The elements and interposed gaps are configured as illustrated by the degrees of a circle which they encompass, thus defining a low L-band ceramic fan type filter.

The FIG. 10 embodiment consists essentially of the same components as FIG. 9 and will be given corresponding reference numerals where applicable. The FIG. 10 embodiment differs from the above described FIG. 9 embodiment in that the elements 76′, 82′ and 85′ are tuned by removing material at the points 95, 96, 97, and 98 as necessary to make all three elements tune to the same frequency thus giving a better bandpass response than the FIG. 9 filter. The leg portions 89′ and 91′ are bowed to allow the elements 76′ and 85′ to be lengthened without increasing the size of the disc 88′. As in the FIG. 9 filter, a border 94′ located around the edges of the elements connects with a ground plane on the side of the disc 88′ opposite from the circuit.

A top or mating piece 99 (see FIG. 11) also has a pattern identical with that shown in FIG. 10 etched on it with the border or edges thereof connected with the border 94′ and connected to the ground plane of the backside of piece 99. The patterns on disc 88′ and 99 are so made that they impose on each other when the pieces are faced together as shown in FIGURE 11. These pieces are fuzed together by either a special solder or a gallium gold interface which will form a compound binding the two circuits together making one circuit interposed between the two ground planes and separated therefrom by the ceramic material.

As shown in FIG. 11, the mating or top piece 99 is cut at 99′ as shown so that portions of the disc 88′ are exposed. Transition leads 100 and 101 are mounted on disc 88′ which respectively interconnect the input and output lead 75′ and 93′ of disc 88′ (see FIG. 10) with lines 102 and 103 mounted on the surrounding mother material 104, which, for example, may be Teflon fiber glass, the piece 99 being imbedded in material 104. The lines 102 and 103 and transition leads 100 and 101 may be of the same type as described above with respect to FIG. 1, if desired, to make a composite impedance such that these lines are matched properly with the frequency of operation.

The operation of the fan type filter may be more readily understood by tracing a signal through the FIG. 12 circuit which incorporates the FIG. 10 filter. The signal from a coaxial cable, for example, connected through input coupling 105, enters on a 50 ohm line 102′, at the left and undergoes a transformation through line 100′ to an impedance sufficiently high to match the input impedance of the ceramic support filter 88′ via input lead 75′. This is a variable determined by a combination of the percent bandwidth and the amount of coupling needed to give the desired bandpass shape. The input impedance is matched by a tap point on the input resonant circuit element 76′. The signal excites the input resonator or element 76′ which in turn excites the center resonator or element 82′. The center resonator 82′ then couples energy into the output resonator or element 85′, whose tap matches into the output lead or line 93′. The signal then transforms via line 101′ down to the 50 ohm impedance of output line 103′ and out through coupling 106. All couplings are by an electron magnetic field, with electrostatic coupling purposely minimized to allow achievement of bandpass operation.

While not shown, the filter elements may be provided with holes in the center thereof which serve to increase the inductance thus trimming the frequency lower. Also, a hole or material removal in the outer ends of the elements will reduce the capacity thus raising the resonant frequency.

The filter circuitry above described is not limited to ceramic materials but may be supported by other materials such as irradiated polyethylene. However, the advantages of the high dielectric constant, high Q ceramic is smaller size, less copper loss, and greater temperature stability with a higher operating temperature limit. Further advantages of ceramic material are its resistance to humidity, shock, and lack of aging effects. The end result is a very compact structure for use in the low microwave frequency bands.

It has thus been shown that the filters of this invention provide means of obtaining bandpass structure in microwave stripline having less loss and greater compactness than the prior known filters, the coupling between the filter sections being magnetically or electrostatically (inductive or capacitive) coupled.

While particular embodiments of the invention have been illustrated and described, modifications and changes will become apparent to those skilled in the art, and it is intended to cover in the appended claims, all such modifications and changes as come within the true spirit and scope of the invention.

What I claim is:

1. In a microwave frequency-selective circuit, a filter circuit which comprises a pair of conductive surfaces in spaced parallel planes maintained at a common potential to form ground planes, a layer of insulating material adjacent each of said conductive surfaces, and circuit elements interposed between said layers of insulating material, said circuit elements including a plurality of elongated magnetically coupled conductive strips, said conductive strips being resonant at a desired frequency and arranged with their longitudinal axes parallel relative to each other and transversely of the direction of signal propagation, the adjacent sides of said conductive strips being configured so as to define a converging-diverging gap therebetween, thereby inductively coupling said conductive strips and also substantially eliminating the capacitive coupling between said conductive strips, said circuit elements additionally including a pair of strips of high impedance material, each of said strips being operatively connected to a different one of said conductive strips, a pair of impedance transformation strips operatively connected to said high impedance strips at one end thereof and to line terminals at the other end thereof, said transformation strips being approximately equal to half wave length or greater than the operating frequency.

2. In a microwave frequency-selective circuit, a filter circuit which comprises a pair of conductive surfaces in spaced parallel planes maintained at a common potential to form ground planes, a layer of insulating material adjacent each of said conductive surfaces, and circuit elements interposed between said layers of insulating material, said circuit elements including a plurality of elongated capacitively coupled conductive strips, said conductive strips being resonant at a desired frequency and arranged with their longitudinal axes parallel relative to each other and transversely of the direction of signal propagation, the adjacent sides of said conductive strips being configured so as to define members having a generally I-shaped configuration, thereby capacitively coupling said conductive strips and also substantially eliminating the inductive coupling between said conductive strips, said circuit elements additionally including a pair of strips of high impedance material, each of said strips being operatively connected to a different one of said conductive strips, a pair of impedance transformation strips operatively connected to said high impedance strips at one end thereof and to line terminals at the other end thereof, said transformation strips being approximately equal to half wave length or greater than the operating frequency.

3. In a microwave frequency-selective circuit, a filter circuit which comprises a pair of conductive surfaces in spaced parallel planes maintained at a common potential to form ground planes, a layer of insulating material adjacent each of said conductive surfaces, and circuit elements interposed between said layers of insulating material, said circuit elements including a plurality of conductive members, said conductive members each defining a fan-shaped configuration having a body portion and a leg portion, said conductive members being resonant at a desired frequency and arranged with the longitudinal axes of their leg portions parallel to each other and transversely of the direction of signal propagation, said conductive members being inductively coupled across the leg portions thereof, and a border of conductive material extending around at least said body portions of said conductive members, thereby providing a shield for said members.

References Cited

UNITED STATES PATENTS

| | | | |
|---|---|---|---|
| 2,964,718 | 12/1960 | Packard | 333—735 |
| 2,915,716 | 12/1959 | Hattersley | 333—735 |
| 3,348,173 | 10/1967 | Matthei | 333—735 |

H. K. SAALBACH, *Primary Examiner.*

C. BARAFF, *Assistant Examiner.*

U.S. Cl. X.R.

333—84